United States Patent [19]

Liston et al.

[11] Patent Number: 5,066,405

[45] Date of Patent: Nov. 19, 1991

[54] METHOD FOR ABSORBING PETROLEUM BASED PRODUCTS

[76] Inventors: Jack L. Liston, 2627 E. North La., Phoenix, Ariz. 85028; Michael Pipella, 4839 E. Greenway, Scottsdale, Ariz. 85254; Pete Bathemes, 1286 E. Woodridge Cir., Salt Lake City, Utah 84121

[21] Appl. No.: 498,027

[22] Filed: Mar. 23, 1990

Related U.S. Application Data

[63] Continuation-in-part of Ser. No. 374,189, Jul. 3, 1989, abandoned.

[51] Int. Cl.[5] .............................................. B01D 15/04
[52] U.S. Cl. ................................... 210/693; 210/924; 55/74; 55/316; 502/402
[58] Field of Search ...................... 55/74, 97, 316, 387; 210/496, 502, 506, 649, 693, 924; 502/402

[56] References Cited

U.S. PATENT DOCUMENTS 3,862,963  1/1975  Hoshi et al. .......................... 502/402
4,519,816  5/1985  Clarke .................................... 57/74

FOREIGN PATENT DOCUMENTS 91091      8/1974   Japan ..................................... 55/74
WO8202342  7/1982   World Int. Prop. O. ............. 55/74
WO8404913  12/1984  World Int. Prop. O. ............. 55/74

OTHER PUBLICATIONS

Aerosil Brochure-Fumed Silica Degussa.

*Primary Examiner*—Bernard Nozick
*Attorney, Agent, or Firm*—Don J. Flickinger; Jordan M. Meschkow

[57] ABSTRACT

A method for absorbing oils and petroleum based products, having a buoyant, anti-static foam pad impregnated with a hydrophobic amorphous silicate.

2 Claims, No Drawings

METHOD FOR ABSORBING PETROLEUM BASED PRODUCTS

CROSS-REFERENCE TO RELATED APPLICATION

This application is a continuation-in-part of my earlier application entitled "Method and Apparatus for absorbing petroleum based products," which was filed on 3 July 1989 and assigned Ser. No. 374,189.

BACKGROUND OF THE INVENTION

1. Field of the Invention

This invention relates to a method and apparatus for absorbing petroleum based products.

In particular, this invention relates to a method and apparatus for removing spillage of petroleum based products.

2. The Prior Art

Methods and apparatuses for removing petroleum based product spillage have been needed for many years, and are well known in prior art.

Small quantities of petroleum spillage, such as oil, frequently occur on solid surfaces, especially roadways and garages. In prior art, small quantities of spillage can be removed by spreading oil absorbing materials, such as saw dust, over the oil. However, the oil laden saw dust is difficult to collect and dispose of and this method is only practical on small quantities. Many times the spillage is simply sluiced off the surface using a hose, resulting in possible ground water contamination and pollution in general.

The largest and most damaging spills occur on water. Petroleum based products spilled in oceans and lakes are very difficult to remove, and cause extensive damage to the environment. In prior art the spillage is contained by large booms which encircle it. While booms have been used to successfully contain petroleum spillage, they can be rendered ineffective by adverse weather, rough seas, or many other factors. However, even when contained, the spillage must be removed. This is done by skimming. Skimming is a very time consuming and difficult technique. A great amount of man-power is needed, and the expense is very high.

Another method of removing spillage is to burn it off. A petroleum based product, such as oil, is ignited and allowed to burn. While less expensive than skimming, the oil is not reclaimable and the atmosphere pays a high price due to the large quantities of smoke and pollution produced. Also, it is difficult to ignite the spillage, the correct weather and other factors must be met.

Petroleum spillage may also wash ashore, contaminating shorelines and beaches. Petroleum absorbing materials can be used, and often are. Saw dust, or more commonly straw, is spread over the spillage. While this material will absorb petroleum, it will also absorb water. The material's hydrophilic property is the reason it cannot be used to remove spillage in open water or even when contained by a boom. When used on a shoreline, only areas above the water line can be effectively cleaned. Any water present will reduce the effectiveness of the petroleum absorbing material, making its use impractical. Also, the oil laden material is difficult to collect and dispose of.

Another problem associated with many oil spills is the presence of combustible gases in the ambient air surrounding the spill. Various oil absorbing products which have been used in the past have been known to create static electricity, which can ignite these gases, leading to explosions and fires.

It would be highly advantageous, therefore, to remedy the foregoing and other deficiencies inherent in the prior art.

Accordingly, it is an object of the present invention to provide a new and improved method and device for absorbing petroleum based products.

Another object is to provide a method and device which works on water or on a dry surface.

And another object is to provide a reusable petroleum based product absorbing device.

Still another object is to provide a relatively inexpensive method and device for removing spillage of petroleum based products.

Yet another object is to provide a device which is easily and efficiently used.

A further object is to provide a hydrophobic petroleum absorbing device which is easily and inexpensively shipped.

And a further object is to provide a device which has an infinite shelf life.

Yet a further object is to provide a method and device which is non-toxic.

And still a further object is to provide an anti-static petroleum absorbing device which can be utilized safely in the presence of explosive vapors.

SUMMARY OF THE INVENTION

To achieve the desired objects of the present method and apparatus in accordance with a preferred embodiment thereof, provided is a hydrophobic amorphous silicate and an anti-static, buoyant foam material. The foam material is impregnated with the silicate to form a hydrophobic absorbant pad which is used to remove spillage of petroleum based products.

DETAILED DESCRIPTION OF THE PREFERRED EMBODIMENT

The present invention removes spillage of petroleum based products by absorption. A buoyant material is impregnated with a hydrophobic amorphous silicate. The function of the buoyant material is to provide a supporting structure for the silicate and to provide buoyancy for use in water. Therefore, any material which is buoyant and which can be impregnated with the hydrophobic amorphous silicate can be used. However a foam material is preferred and in the preferred embodiments a polyurethane foam is used. It will be understood by those skilled in the art that other foams such as polystyrene may also be used.

In environments such as oil rigs and the like, where the material to be absorbed is surrounded by explosive vapors, it is essential that the buoyant material be free of static electricity. One specific material which has been found to be satisfactory for these purposes is anti-static polyurethane foam, which is readily available from any foam manufacturer. The anti-static foam should have a density in the range of 1.4 to 2 pounds per cubic foot. An anti-static foam having a density of 1.45 pounds per cubic foot has been employed with excellent results.

The hydrophobic amorphous silicate is used in a powder form. The powder absorbs petroleum based products while repelling water. This allows impregnated foam pads to absorb petroleum products from water. In this embodiment, the powder used is a fumed silicon dioxide known under the trademark AEROSIL ® and specifically designated AEROSIL ® R972. While this is the preferred silicate powder, any hydrophobic amorphous silicate can be used.

There are four methods for impregnating the foam with the silicate powder. A first method is to mix the silicate powder into the liquid foam before the foam is allowed to rise and harden. A second method is to sprinkle the silicate powder onto the liquid foam as it rises. A third method is to tumble dust the already risen foam. In this method, the foam is placed in a container with a quantity of the silicate powder and tumbled to allow the silicate powder to coat and invade the material. A fourth method is to use rollers to compress the already risen foam in the presence of the silicate powder. Upon expansion, the foam "sucks in" a greater quantity of the silicate powder than is possible with other methods of impregnation.

The first two methods allow the foam liquid and silicate powder to be easily transported. Once at the site of the spillage the foam liquid is allowed to rise. The foam liquid can be transported easily and in great quantity. The foam pads of the third and fourth methods as well as the first two, can also be transported easily. The impregnated material is very light and is also, in some cases, compressible which reduces the volume of space required. The impregnated pads, the silicate powder and the foam can all be stored for an indefinite amount of time.

The impregnated foam can have an infinite number of sizes. Very large pads can be formed and stored on rolls, or smaller pads can be formed and used in great numbers. These impregnated foam pads are then transported to the spill site. If the foam liquid mixed with the silicate powder is transported to the spill site, very large pads can be formed directly on the site.

The impregnated pads, may also be used to filter petroleum products from air. There are many areas where oil can be suspended in air such as machine shops or manufacturing facilities. This can cause problems when it settles out, such as affecting machinery and the oil residue collecting dirt and dust. An impregnated pad is placed in a duct through which the oil laden air is traveling. As the air passes through the impregnated pad, the oil is absorbed. This air filtering method can be used to filter air entering buildings, used in automotive air conditioning system and other areas where oil or other petroleum based product in air could cause health problems or damage.

This impregnated pad can also be used to absorb the oils and grease, such as cooking oils and kitchen grease, which may become suspended in the air when cooking. The air can be circulated through an air system and made to pass through an impregnated pad, extracting the oil from the air.

The impregnated foam pads can be placed in contact with the spillage in a number of ways. On oceans or lakes, pads can be dumped on the periphery of the spill and allowed to drift over the spill with the wind or currents. They do not necessarily have to be dumped in the middle of the spill. Once the pads have had sufficient time to absorb the petroleum based product, they are collected. The petroleum product can then be squeezed out of the pads and the pads can be reused. Experimentation has shown that the pads may be reused as many as three times. The collected petroleum product can then be refined to remove any silicate powder.

As a specific example of the present invention, five polyurethane foam pads with the dimensions 1"×5"×5" were provided. The pads were tumble dusted with a silicate powder, AEROSIL ® R972, for approximately 30 seconds. Four liters of water and 240 g of NaCl were added to each of five containers and kept at a constant 3° C. to simulate sea water in northern altitudes. Subsequently, petroleum based products were added to the containers as follows:

container 1 received 400 ml of water to serve as a negative control;
container 2 received 400 ml diesel fuel;
container 3 received 400 ml SAE 40 motor oil; and
container 4 and 5 each received 400 ml of SAE 140 gear oil.

The five impregnated foam pads were each weighed and one pad was added to each of the five containers. The pads in containers 1, 2, 3 and 4 were weighed at 30 minute intervals for a period of three hours. After each weighing the pads were inverted and returned to the container. The pad in container 5 was weighed after soaking for 2 hours undisturbed, inverted and returned to container 5 for 1 hour and reweighed. Subsequently to the 3 hour test all the pads were inverted and returned to their respective containers and allowed to remain undisturbed for 12.5 hours.

The results are shown in the table below:

TABLE I

RESULTS SHOWING THE SELECTIVE ABSORPTION OF DIESEL FUEL AND OIL BY OIL OTTER FOAM PADS AT 6° C.

| CONTAINER NO. | MATERIAL | VOLUME OIL (ML) | TIME INTERVALS (HOURS) | | | | | | | | TOTAL OIL REMOVED (g) |
|---|---|---|---|---|---|---|---|---|---|---|---|
| | | | 0 | 0.5 | 1.0 | 1.5 | 2.0 | 2.5 | 3.0 | 15.5 | |
| 1 | Water No oil | 0 | 7* | 7 | 7 | 7 | 7 | 7 | 7 | 7 | 0 |
| 2 | Diesel Fuel | 400 | 8 | 340 | 344 | 340 | 342 | 342 | 340 | 340 | 340 |
| 3 | SAE 40 Oil | 400 | 8 | 78 | 118 | 146 | 170 | 196 | 226 | 240 | 240 |
| 4 | SAE 140 OIL | 400 | 8 | 62 | 94 | 106 | 140 | 166 | 206 | 204 | 206 |
| 5 | SAE 140 OIL | 400 | 9 | ND | ND | ND | 54 | ND | 154 | 186 | 186 |

ND = not done
* = weight oil otter pad (grams)

The impregnated pad in container (no oil) did not increase in weight during the 15.5 hour test, therefore no water was absorbed.

The impregnated pad in container 2 (diesel fuel) was saturated with 340 g of diesel fuel after a thirty minute exposure, increasing in weight by 4,250%.

The impregnated pad in container 3 (SAE 40 oil) absorbed 94% or 226 g of the total oil absorbed within the first 3 hours, increasing in weight by 2,825%.

The impregnated pad in container 4 (SAE 140 oil) was saturated with 206 g of oil within the first 3 hours of exposure, increasing in weight by 2,575%.

The impregnated pad in container 5 (SAE 140 oil) absorbed 53 g less oil after 3 hours and 19 g less after 15.5 hours than the pad in container 4. This is most likely due to the pad in container 5 being inverted fewer times.

While a specific embodiment of the present invention has been described, further modifications and improvements will occur to those skilled in the art. It should, therefore, that this invention is not limited to the particular form or method shown and the appended claims are intended to cover all modifications which do not depart from the spirit and scope of this invention.

Having fully described the invention in such clear and concise terms as to enable those skilled in the art to understand and practice the same, the invention claimed is:

1. A method for absorbing oils and petroleum-based products from a body of water, said method comprising the steps of:
   selecting a liquid anti-static polyurethane foam material;
   allowing said liquid foam material to rise;
   sprinkling a hydrophobic amorphous silicate powder over said liquid foam as it rises;
   allowing said liquid foam material to harden;
   placing the hardened foam material in said body of water in contact with said oils and petroleum-based products; and
   allowing said foam material to absorb said oils and petroleum-based products.

2. A method for absorbing oils and petroleum-based products from a body of water, said method comprising the steps of:
   selecting a liquid anti-static polyurethane foam material;
   allowing said liquid foam material to rise;
   allowing said liquid from material to harden in the form of a pad;
   tumbling said pad in a container holding a hydrophobic amorphous silicate powder to allow said powder to coat and invade said pad;
   placing said pad in said body of water in contact with said oils and petroleum-based products; and
   allowing said pad to absorb said oils and petroleum-based products.

* * * * *